US012417110B2

(12) United States Patent
Nachreiner

(10) Patent No.: US 12,417,110 B2
(45) Date of Patent: Sep. 16, 2025

(54) BRIDGING UI ELEMENTS ACROSS MULTIPLE OPERATING SYSTEMS

(71) Applicant: MICROSOFT TECHNOLOGY LICENSING, LLC, Redmond, WA (US)

(72) Inventor: Philip John Nachreiner, Carnation, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/213,099

(22) Filed: Jun. 22, 2023

(65) Prior Publication Data

US 2024/0053996 A1 Feb. 15, 2024

Related U.S. Application Data

(60) Provisional application No. 63/398,209, filed on Aug. 15, 2022.

(51) Int. Cl.
*G06F 17/00* (2019.01)
*G06F 9/451* (2018.01)
*G06F 9/455* (2018.01)

(52) U.S. Cl.
CPC .......... *G06F 9/452* (2018.02); *G06F 9/45558* (2013.01)

(58) Field of Classification Search
CPC .............................. G06F 9/452; G06F 9/45558
USPC ........................................................ 715/733
See application file for complete search history.

(56) References Cited

U.S. PATENT DOCUMENTS

| 6,144,377 | A  | * | 11/2000 | Oppermann | G06F 9/451 |
| | | | | | 715/744 |
| 7,334,216 | B2 | * | 2/2008 | Molina-Moreno | G06F 8/35 |
| | | | | | 717/109 |
| 9,158,434 | B2 | * | 10/2015 | Beveridge | G06F 3/0484 |
| 9,256,402 | B2 | * | 2/2016 | Torok | G06F 8/34 |
| 9,355,081 | B2 | * | 5/2016 | Zhang | G06F 3/0481 |
| 9,448,776 | B1 | * | 9/2016 | Sankaran | G06F 16/957 |
| 9,507,882 | B1 | * | 11/2016 | Tajuddin | G06F 3/0484 |
| 9,772,986 | B2 | * | 9/2017 | Zhang | G06F 40/174 |

(Continued)

FOREIGN PATENT DOCUMENTS

WO WO-2012090072 A1 * 7/2012 ............... G06F 8/38

OTHER PUBLICATIONS

International Search Report and Written Opinion received for PCT Application No. PCT/US23/027759, Nov. 9, 2023, 14 pages.

(Continued)

*Primary Examiner* — Mohammed H Zuberi
(74) *Attorney, Agent, or Firm* — Han Gim; Newport IP, LLC

(57) ABSTRACT

Techniques are disclosed for enabling use of user interface (UI) elements across multiple operating systems. An indication of a UI element is selected via an interface of the first operating system. A mapping between UI elements of the first operating system and the second operating system is accessed. Based on the mapping, a corresponding UI element is provided to the second operating system. The corresponding UI element provides an equivalent UI element in the second operating system that corresponds to the UI element entered via the interface of the first operating system.

17 Claims, 10 Drawing Sheets

(56) References Cited

U.S. PATENT DOCUMENTS

| | | | | |
|---|---|---|---|---|
| 9,858,321 B2* | 1/2018 | Shakespeare | | G06F 16/252 |
| 10,127,023 B2* | 11/2018 | Shakespeare | | G06F 8/61 |
| 10,198,522 B1* | 2/2019 | Boyle | | H04M 1/72403 |
| 10,235,430 B2* | 3/2019 | N | | G06Q 30/01 |
| 10,331,765 B2* | 6/2019 | Smit | | G06Q 10/06 |
| 10,558,434 B2* | 2/2020 | Shakespeare | | G06F 8/315 |
| 10,747,943 B2* | 8/2020 | Weng | | G06F 16/957 |
| 2009/0070687 A1* | 3/2009 | Mazzaferri | | G06F 9/542 |
| | | | | 715/751 |
| 2009/0249331 A1* | 10/2009 | Davis | | G06F 9/45558 |
| | | | | 718/1 |
| 2011/0099481 A1* | 4/2011 | Bitonti | | G06F 3/0481 |
| | | | | 715/740 |
| 2011/0252147 A1* | 10/2011 | Ewe | | H04M 1/72448 |
| | | | | 709/227 |
| 2013/0290856 A1* | 10/2013 | Beveridge | | G06F 3/1454 |
| | | | | 715/740 |
| 2013/0290858 A1* | 10/2013 | Beveridge | | G06F 16/957 |
| | | | | 715/740 |
| 2014/0082511 A1* | 3/2014 | Weissberg | | G06F 9/452 |
| | | | | 715/740 |
| 2014/0223432 A1* | 8/2014 | Halim | | G06F 9/452 |
| | | | | 718/1 |
| 2014/0351684 A1* | 11/2014 | Smit | | H04L 67/56 |
| | | | | 715/222 |
| 2015/0019994 A1* | 1/2015 | Freudenthaler | | H04M 1/72412 |
| | | | | 715/748 |
| 2017/0038929 A1* | 2/2017 | Momchilov | | G06F 40/166 |
| 2021/0072883 A1* | 3/2021 | Migunova | | G06F 9/451 |
| 2022/0365761 A1* | 11/2022 | Shin | | H04N 21/431 |

OTHER PUBLICATIONS

"AccessibilityCache.java", Retrieved from: https://cs.android.com/android/platform/superproject/+/master:frameworks/base/core/java/android/view/accessibility/AccessibilityCache.java, Retrieved on: Jul. 28, 2022, 16 Pages.

"AccessibilityEvent", Retrieved from: https://developer.android.com/reference/android/view/accessibility/AccessibilityEvent, Jun. 8, 2022, 43 Pages.

"AccessibilityRecord", Retrieved from: https://developer.android.com/reference/android/view/accessibility/AccessibilityRecord#getSource( ), Jun. 8, 2022, 25 Pages.

"AccessibilityService", Retrieved from: https://developer.android.com/reference/android/accessibilityservice/AccessibilityService#onServiceConnected( ), Jul. 13, 2022, 57 Pages.

"AccessibilityServiceInfo", Retrieved from: https://developer.android.com/reference/android/accessibilityservice/AccessibilityServiceInfo#eventTypes, Jun. 8, 2022, 38 Pages.

"Androidx.test.uiautomator", Retrieved from: https://developer.android.com/reference/androidx/test/uiautomator/package-summary, Sep. 26, 2022, 2 Pages.

"Create Dynamic Lists with RecyclerView", Retrieved from: https://developer.android.com/develop/ui/views/layout/recyclerview, Nov. 22, 2022, 6 Pages.

"Debug your layout with Layout Inspector and Layout Validation", Retrieved from: https://developer.android.com/studio/debug/layout-inspector, Sep. 15, 2022, 15 Pages.

"Espresso", Retrieved from: https://developer.android.com/training/testing/espresso, Oct. 27, 2021, 3 Pages.

"IRawElementProviderFragment Interface (uiautomationcore.h)", Retrieved from: https:/learn.microsoft.com/en-us/windows/win32/api/uiautomationcore/nn-uiautomationcore-irawelementproviderfragment, Oct. 6, 2021, 2 Pages.

"IRawElementProviderFragmentRoot Interface (uiautomationcore.h)", Retrieved from: https://learn.microsoft.com/en-us/windows/win32/api/uiautomationcore/nn-uiautomationcore-irawelementproviderfragmentroot, Oct. 6, 2021, 2 Pages.

"IRawElementProviderSimple Interface (uiautomationcore.h)", Retrieved from: https://learn.microsoft.com/en-us/windows/win32/api/uiautomationcore/nn-uiautomationcore-irawelementprovidersimple, Oct. 6, 2021, 2 Pages.

"Layers and Displays", Retrieved from: https://source.android.com/docs/core/graphics/layers-displays#display, Oct. 18, 2022, 3 Pages.

"Supporting Screen Readers", Retrieved from: https://web.archive.org/web/20211020020355/https://docs.unrealengine.com/4.27/en-us/InteractiveExperiences/UMG/UserGuide/ScreenReader/, Oct. 20, 2021, 2 Pages.

"SurfaceFlinger and WindowManager", Retrieved from: https://source.android.com/docs/core/graphics/surfaceflinger-windowmanager#surfaceflinger, Oct. 11, 2022, 3 Pages.

"Test your App's Accessibility", Retrieved from: https://developer.android.com/guide/topics/ui/accessibility/testing, Jan. 25, 2022, 14 Pages.

"UI Accessibility Plugin (UAP)", Retrieved from: https://web.archive.org/web/20210514063602/https://assetstore.unity.com/packages/tools/gui/ui-accessibility-plugin-uap-87935, May 14, 2021, 2 Pages.

"Write Automated Tests with UI Automator", Retrieved from: https://developer.android.com/training/testing/other-components/ui-automator#ensure-activity, Mar. 17, 2022, 12 Pages.

Batchelor, et al., "Control Type Identifiers", Retrieved from: https://learn.microsoft.com/en-us/windows/win32/winauto/uiauto-controltype-ids, Dec. 12, 2020, 3 Pages.

Batchelor, et al., "UI Automation Events Overview", Retrieved from: https://learn.microsoft.com/en-us/windows/win32/winauto/uiauto-eventsoverview, Aug. 20, 2020, 2 Pages.

Batchelor, et al., "UI Automation Overview", Retrieved from: https://learn.microsoft.com/en-us/windows/win32/winauto/uiauto-uiautomationoverview#ui-automation-header-files, Aug. 20, 2021, 4 Pages.

Batchelor, et al., "UI Automation Provider Programmer's Guide", Retrieved from: https://learn.microsoft.com/en-us/windows/win32/winauto/uiauto-providerportal, Apr. 25, 2020, 1 page.

Bridge, et al., "UI Automation Tree Overview", Retrieved from: https://learn.microsoft.com/en-us/windows/win32/winauto/uiauto-treeoverview, Aug. 24, 2019, 4 Pages.

Coulter, et al., "Supporting UI Automation Control Types", Retrieved from: https://learn.microsoft.com/en-us/windows/win32/winauto/uiauto-supportinguiautocontroltypes, Aug. 20, 2020, 2 Pages.

Coulter, et al., "UI Automation Control Patterns Overview", Retrieved from: https://learn.microsoft.com/en-us/windows/win32/winauto/uiauto-controlpatternsoverview, Aug. 20, 2020, 9 Pages.

Coulter, et al., "UI Automation Control Types Overview", Retrieved from: https://learn.microsoft.com/en-us/windows/win32/winauto/uiauto-controltypesoverview#ui-automation-control-type-requisites, Aug. 20, 2020, 3 Pages.

Libby, et al., "Control Types and Their Supported Control Patterns", Retrieved from: https://learn.microsoft.com/en-us/windows/win32/winauto/uiauto-controlpatternmapping, Sep. 29, 2021, 3 Pages.

Nachreiner, et al., "Architecture and Interoperability", Retrieved from: https://learn.microsoft.com/en-us/windows/win32/winauto/architecture-and-interoperability, Jan. 7, 2022, 4 Pages.

Satran, et al., "UI Automation Providers Overview", Retrieved from: https:/learn.microsoft.com/en-us/windows/win32/winauto/uiauto-providersoverview, Aug. 24, 2019, 4 Pages.

Tatar, Calin, "WPF UI Automation", Retrieved from: https://www.codeproject.com/articles/33049/wpf-ui-automation, Feb. 20, 2009, 8 Pages.

Walker, et al., "Accessibility Tools—Inspect", Retrieved from: https://learn.microsoft.com/en-us/windows/win32/winauto/inspect-objects, Sep. 11, 2021, 7 Pages.

* cited by examiner

BRIDGING UI ELEMENTS ACROSS MULTIPLE OPERATING SYSTEMS

PRIORITY APPLICATION

This application claims the benefit of and priority to U.S. Provisional Application No. 63/398,209, filed Aug. 15, 2022, the entire contents of which are incorporated herein by reference.

BACKGROUND

Virtual machines (VMs) and emulators allow a guest operating system (OS) to execute on the same computing device as a host operating system. In some cases, a feature running on the guest OS may be rendered in a proxy application running on the host OS. The proxy application may look and feel like an application that is native to the host OS. However, features native to the host operating system and features native to the guest operating system typically do not interoperate. For example, a feature for ANDROID does not automatically execute on WINDOWS. Nevertheless, there are many advantages to enabling features that are native to different operating systems to operate consistently on the same operating system. Consistently running features native to different operating systems on the same OS allows interactions between features that would otherwise be unavailable.

It is with respect to these and other considerations that the disclosure made herein is presented.

SUMMARY

An advantage of running features native to different operating systems (OSes) on the same OS is to increase the number of available applications and features that can run on a particular OS. However, there are some challenges in allowing features native to different OSes to run on the same OS. For example, an application running on a host OS may not be able to automate, debug, extract data from, or otherwise control a guest application that is being rendered in a proxy application running on the host OS. For example, a user may wish to control a guest application via the proxy application. However, user interface (UI) commands may not be properly forwarded from the proxy application to the guest application. Even if the UI commands are properly forwarded, the UI commands may not be properly interpreted by the guest application.

One example where such incompatibilities can be problematic is in the implementation of assistant or assistive (hereinafter collectively referred to as "assistive") technologies. Many operating systems provide an assistive service layer that provides assistive tools to enhance the way that users can interact with computing devices. Assistive tools may include computer-implemented virtual assistants, natural language and/or conversational UIs (e.g., chat UIs), artificial intelligence (AI) interfaces (e.g., those comprising large language models (LLMs) and/or other generative AI models (supporting one or more modalities), machine learning (ML), and/or other AI models). Another example of assistive tools includes computer accessibility tools that enable users with disabilities to fully interact with the computing device and provide inputs to various human-to-machine interfaces. Such computer accessibility tools can include functions such as text-to-speech and closed-captioning. Applications that allow for user inputs via assistive tools expose their UI features in order to allow the assistive service layer to access the applications and provide computer accessibility interfaces to provide inputs and receive outputs from the applications. However, when running different operating systems, the assistive service layer that is part of one operating system and configured to interpret and render the UI features may be incompatible with applications running on a different operating system.

In one example, a button on a UI may be rendered using a first operating system's assistive tools (for example to render text on the button), receive input indicating when the button has been selected (e.g., clicked/selected using an input device), and render changes to the button or transition to another UI. However, the assistive features for the same button on a second operating system may be implemented in a different manner and may not implement equivalent inputs and actions. This lack of equivalency may result in user inputs being interpreted in an inconsistent manner between the operating systems, which can lead to inconsistent actions being executed by the computing device.

The techniques disclosed herein enable various UI elements, such as but not limited to assistive technologies, to be bridged between operating systems. In various embodiments, assistive tools are described that enable assistive and other applications to interact with UI controls between different operating systems. The assistive tools include components for providing automated UI functionality and can include libraries with various core functions such as screen readers. Among other benefits, the disclosed techniques enable features that do not exist in a particular operating system to be represented in that operating system, and enable those features to be changed or added in that operating system.

By applying the disclosed techniques, computer processing and other resources may be used more efficiently as UI elements and other features from different operating systems may be utilized on the same device. Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
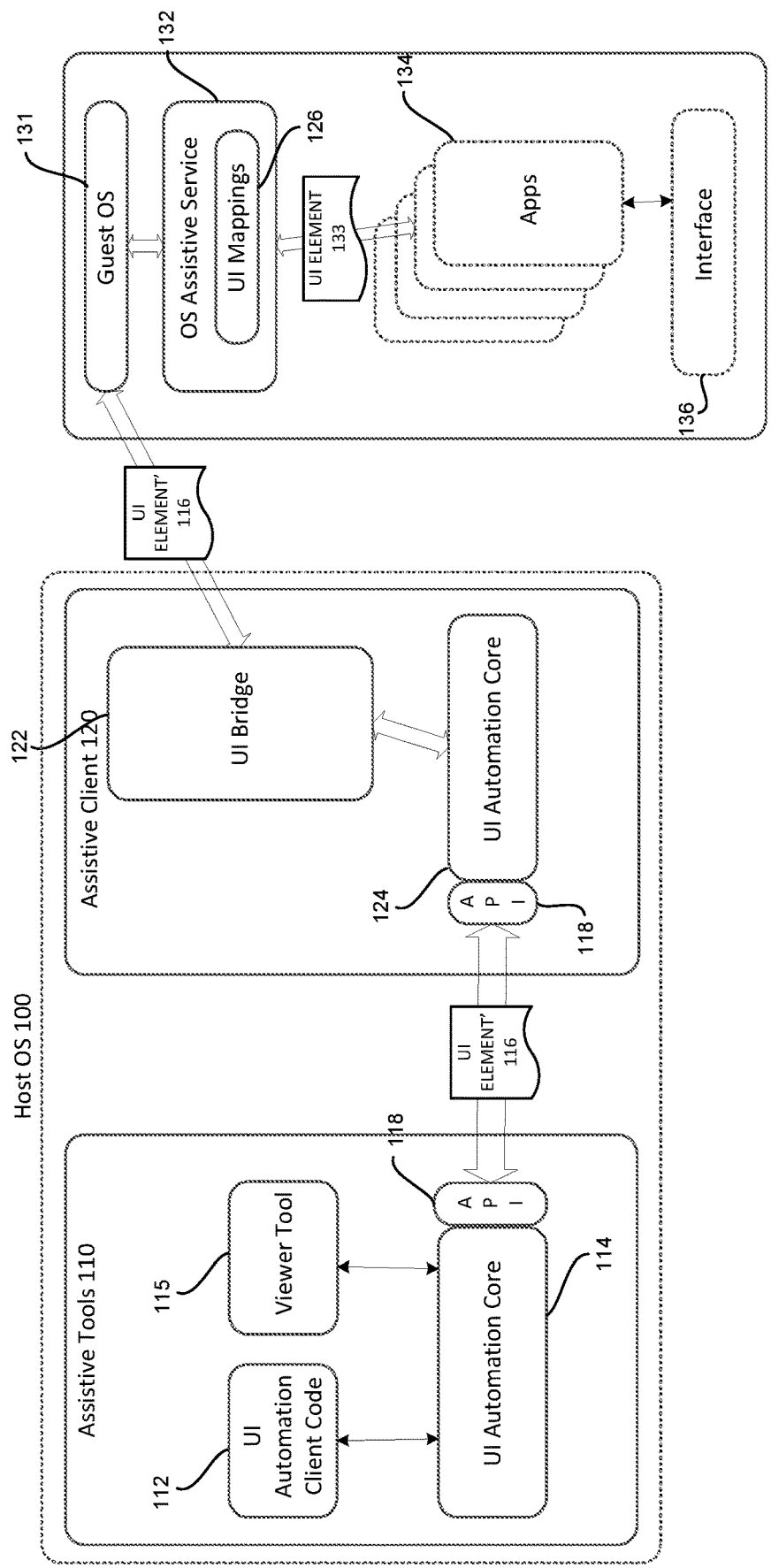
FIG. 1 is a functional diagram illustrating the disclosed embodiments.

The present disclosure describes techniques for enabling various UI elements, such as those associated with, but not limited to, assistive features, to be bridged between different operating systems. Such techniques are useful, for example, when a guest operating system is executing on the same computing device as a host operating system. Multiple operating systems may execute on the same computing device, for example, by running an emulator and a proxy application for each non-native operating system. The proxy application may look and feel like an application that is native to the host operating system. In such cases, features native to the host operating system and features native to the guest operating system may not interoperate properly. For example, a user interface (UI) element may be rendered using the host operating system's assistive tools, but a user input received via the UI element using the host operating system's assistive tools may be implemented in a different manner and may not perform equivalent inputs and/or actions in the guest operating system. In this case, the host operating system may not be able to access or otherwise process the UI element due to incompatibility of the interfaces, which can lead to inconsistent or incorrect actions being executed on the computing device. The disclosed techniques enable UI features to be bridged between different operating systems and thus operate in a consistent and correct manner.

As referred to herein, a UI event refers to an operating system- (OS-) generated response to a user input, such as a mouse click event that is generated in response to a user clicking a mouse button. A UI command refers to a message sent to an application, e.g., a key press event, or a function invocation that affects an application. Generally, UI events and UI commands are referred to herein as UI elements.

The interoperation of UI elements between the proxy application and the guest application is important for enabling a number of features. Merely forwarding all UI events without ensuring interoperation or otherwise modifying the UI elements may result in errors and other undesired results.

To address the above and other issues, the techniques disclosed herein enable UI elements of applications running in one operating system to be bridged to another operating system instance to ensure that the UI elements are received, interpreted, and acted upon in a consistent and predictable manner. The disclosed embodiments support multiple scenarios, including assistive features and test automation.

One type of feature that can be enabled by the disclosed techniques is an assistive feature. Assistive features enhance the way users can interact with computing devices. One example of such an assistive feature includes computer accessibility features that enable users who have an impairment to interact with computer features that may otherwise be a challenge due to the user's impairment. Such assistive features may also include and be referred to as accessibility features, computer accessibility features, impairment features, or inclusivity features. Operating systems typically define a common interface for applications to expose information about the UI to enable features such as assistive features. Assistive features can include, for example, screen readers to provide information to the user about the UI and enable the user to interact with and/or manipulate the UI.

Assistive features typically run in the background and receive callbacks by the system when an assistive event is detected by the operating system. Such events denote some state transition in the user interface. For example, the focus may have changed, a button may have been clicked, etc. Such an assistive feature can optionally request the capability for querying the content of the active window.

The disclosed embodiments provide information about the UI elements exposed by the guest operating system to the host operating system. By exposing the information about the guest operating system's interface in a defined and consistent manner, the disclosed embodiments provide access to users of the host operating system's assistive technology in a manner that enables a seamless, native-feeling experience. Otherwise, assistive clients such as screen readers, narrators, and the like, may be blocked from providing assistive experiences when different operating systems are running in the same computing environment.

FIG. 1 illustrates one example of various components that may be used to implement the disclosed UI bridging features. In an embodiment, assistive tools 110 is a set of UI automation components that are implemented in a client-side device. Assistive tools 110 can include UI automation client code 112 and UI automation core 114. Assistive client 120 includes various application-side components that enable bridging of UI features.

The components illustrated in FIG. 1 enable assistive and other features (e.g., screen readers) to interact with UI controls of various applications. Assistive tools 110 include components for providing automated UI bridging functionality and can include libraries with various core functions such as screen readers. UI automation core 114 and UI automation core 124 are OS components that include interfaces defining how various UIs are exposed and how they are accessed programmatically. UI automation core 114 and UI automation core 124 each include an application programming interface (API) 118 that enables various control frameworks to expose controls and make them visible to various client applications. API 118 enables applications running in one OS to interact with controls in other applications running in another OS and retrieve relevant information to allow for correct actions to be executed. The UI automation core 114 and UI automation core 124 host a set of libraries that enable translation of processes and provide actions that act upon a given set of UI properties.

In an example, when changing a target display that is the focus of the host operating system from a virtual display to a default display, the UI automation core 114 and UI automation core 124 operate to correctly target the correct display. The default display is typically the main display that is the focus of the host operating system and renders the home screen of the guest operating system. The virtual display can represent an application in a separate window, and is typically used as an off-screen surface for applications. Without the bridging features illustrated in FIG. 1, user input actions can be sent to the default display and not the virtual display and thus applications will not have a way to send inputs to the default display. The functionality of UI automation core 114 and UI automation core 124 provide interfaces and mappings that enable applications to target the correct display.

In an embodiment, assistive client 120 includes components that enable access to applications 134 running on a guest operating system 131. The guest operating system 131 may, for example, run on a virtual machine that is hosted on a hypervisor or other virtual machine manager. The guest operating system applications 134 may each have a custom UI and expose a UI element 133 of a currently focused application to UI clients on the host operating system 100. In an embodiment, the custom UI features of UI element 133 are mapped to control types which, as further described below, define what input controls that a given UI feature supports. In some embodiments, the custom UI features are mapped to UI mappings 126. The UI mappings 126 can be structured with a specified layout for storage, viewing, and retrieval purposes. For example, the UI mappings 126 can be structured as a tree hierarchy.

FIG. 1 illustrates a UI bridge 122 that is part of assistive client 120. UI bridge 122 communicates with guest OS 131 via an assistive service 132 which communicates with applications 134. For example, UI automation core 124 can query data from guest OS 131 via UI bridge 122. If a UI being controlled by the guest OS 131 is updated by the guest OS 131, assistive service 132 may send UI element 133 to OS assistive service 132. UI mappings 126 provides assistive mapping information for mapping between UI elements of the host operating system 100 and the guest operating system 131. The assistive mapping information may be used to determine a corresponding UI element 116 (referred to as UI element') to be provided to the host operating system 100. The corresponding UI element 116 is passed to UI bridge 122 and to assistive tools 110. The assistive mapping information in UI mappings 126, as further described herein, may include mapping information to enable bridging of various UI features between the guest operating system 131 and those of the host operating system 100. The assistive mapping information in UI mappings 126, in some embodiments, can be structured as a tree.

In an embodiment, a viewer tool 115 may be provided to inspect the UI elements of guest OS applications 134. The viewer tool 115 provides a visual interface to inspect a layout hierarchy for the UI mappings 126 and view the properties of various UI components. The UI components shown in the viewer tool 115 can include those that are currently visible in the foreground of the UI of the guest OS 131. In some cases, the guest OS 131 may provide functionality to examine details of a UI layout at runtime.

In an example, use of UI elements across multiple operating systems such as host operating system 100 and a guest operating system 131 includes receiving an indication of a UI element 133 selected via an interface 136 of the guest operating system 131, for example via a user input on a touchscreen. UI mappings 126 are accessed that include mappings between UI elements of the host operating system 100 and a guest operating system 131. Based on the UI mappings 126, an indication of a corresponding UI element 116 is provided to the host operating system 100. The corresponding UI element 116 provides an equivalent UI element in the host operating system that corresponds to the UI element 133 selected via the interface 136 of the guest operating system 131.

While the described UI bridge functionality may be implemented in various components described herein, the functionality is referred generally herein as a UI automation function. In an embodiment, the UI automation function provides UI mapping information that includes control patterns, where control types have a set of control patterns that a given UI control must support, a set that is optional, and a set that the control does not support. In an embodiment, the UI mapping information includes property values, where control types have a set of properties that the control supports.

In an embodiment, the UI mapping information includes UI events, where each control type has a set of UI events that the control type supports. In an embodiment, UI mapping information is implemented as a tree structure, where each control type defines how the control appears in the UI tree structure. For UI elements that do not match a particular control type, a custom control type ID may be used to describe the control and relevant control patterns and properties.

In an embodiment, the UI automation function exposes elements of a given UI to client applications as an object represented by a UI automation element interface. Each object (which may also be referred to herein as a UI element) is contained in the UI tree structure, with the desktop as the root element or a virtual root. In an embodiment, the UI automation function allows clients to view the UI tree structure or filter the UI tree structure as a control view or a content view.

Figure 2:
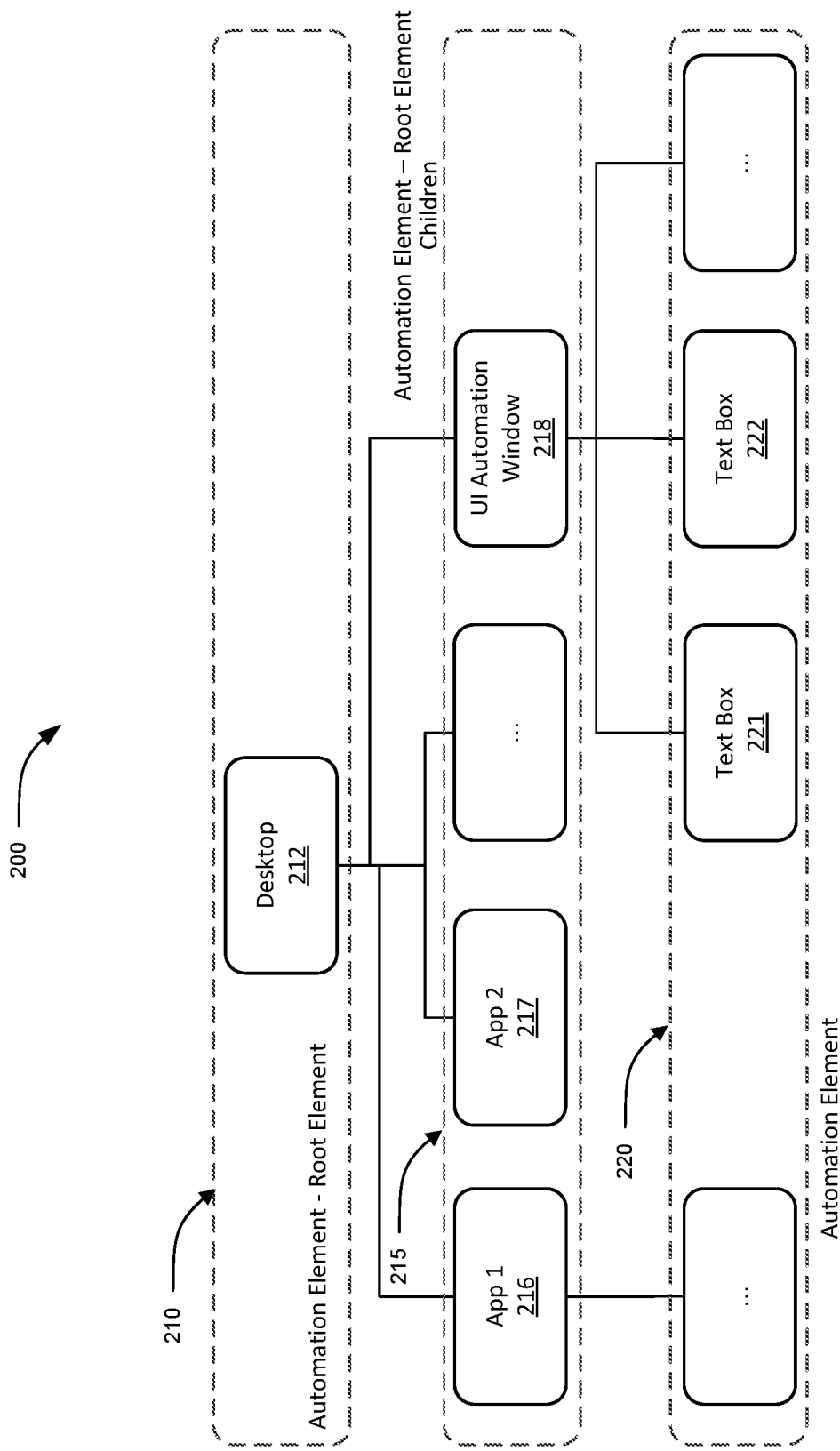
FIG. 2 illustrates an example UI element.

FIG. 2 illustrates an example of a UI automation hierarchy view. In an embodiment, the UI automation function exposes elements of the UI to client applications as an object represented by a UI automation element 220. Elements are contained in a tree structure 200, with the desktop 212 as the root element 210 and root element children 215 comprising application 1 216, application 2 217, UI automation window 218, and so on. UI automation window 218 can further comprise automation elements text box 221 and text box 222. Clients can filter the raw view of the tree structure 200 as a control view or a content view. The raw view includes the full tree of automation element objects for which the desktop is the root. The control view is a subset of the raw view that maps to the UI structure as viewed by a user. The content view is a subset of the control view that contains content that is relevant to the user in a given context, such as the values in a drop-down combo box. UI automation element 220 exposes properties of the control or UI element that it represents. One of these properties is the control type, which defines the basic appearance and functionality of the control or UI element as a single recognizable entity, for example, a button or check box.

UI elements expose one or more control patterns. Control patterns provide a set of properties that are specific to a particular control type. Control patterns expose more information about a UI element. Mapping of control types to control patterns can be 1:1, 1 to many, or many to 1. For example, a combo box can support at least two control patterns, one to expand and collapse, and another to represent selection. Controls typically represent a single control type. UI elements are typically parts of a UI, for example a window. The UI element can define an element as a content element or a control element.

In an embodiment, the UI automation function raises UI events to UI automation clients rather than broadcasting UI events. This allows for selectively raising UI events based on whether any clients are available. In an embodiment, the UI automation function includes a framework that manages child controls and rendering in an area of the screen. For example, an operating system framework can contain multiple UI automation elements, such as a menu bar, a status bar, and buttons. In an embodiment, a subtree of elements from a particular framework is referred to as a fragment. The element at the root node of the subtree is referred to as a fragment root, which can be hosted within another framework.

The following provides an example implementation of the disclosed techniques using Component Object Model (COM) interfaces and WINDOWS assistive features. COM interfaces can be implemented to provide functionality for custom controls. To provide basic functionality, a UI automation provider implements at least an IRawElementProviderSimple interface. The IRawElementProviderFragment and IRawElementProviderFragmentRoot interfaces can be implemented for elements in a complex control to provide additional functionality. The IRawElementProviderSimple interface provides basic functionality for a control hosted in a window, including support for control patterns and properties. The IRawElementProviderFragment interface adds functionality for an element in a complex control, including navigating in the fragment, setting focus, and returning the bounding rectangle of the element. The IRawElementProviderFragmentRoot interface adds functionality for the root element in a complex control, including locating a child element at specified coordinates and setting the focus state for the entire control. An assistive service can be configured to receive specific types of assistive events, listen only to specific packages, receive events from each type only once in a given time frame, retrieve window content, specify a settings activity, etc.

In an embodiment, the following properties are configured to receive accessibility events, which are examples of assistive events. A meta-data entry in the manifest (e.g., a document that is used for binding and activation) can be provided when declaring the service.

AccessibilityServiceInfo #eventTypes
AccessibilityServiceInfo #feedbackType
AccessibilityServiceInfo #flags
AccessibilityServiceInfo #notificationTimeout
AccessibilityServiceInfo #packageNames Window content may be retrieved which is represented as a tree of AccessibilityWindowInfo and AccessibilityNodeInfo objects using the following methods:

AccessibilityEvent.getSource( )
AccessibilityService #findFocus(int)
AccessibilityService #getWindows( )
AccessibilityService #getRootInActiveWindow( )

Figure 3:
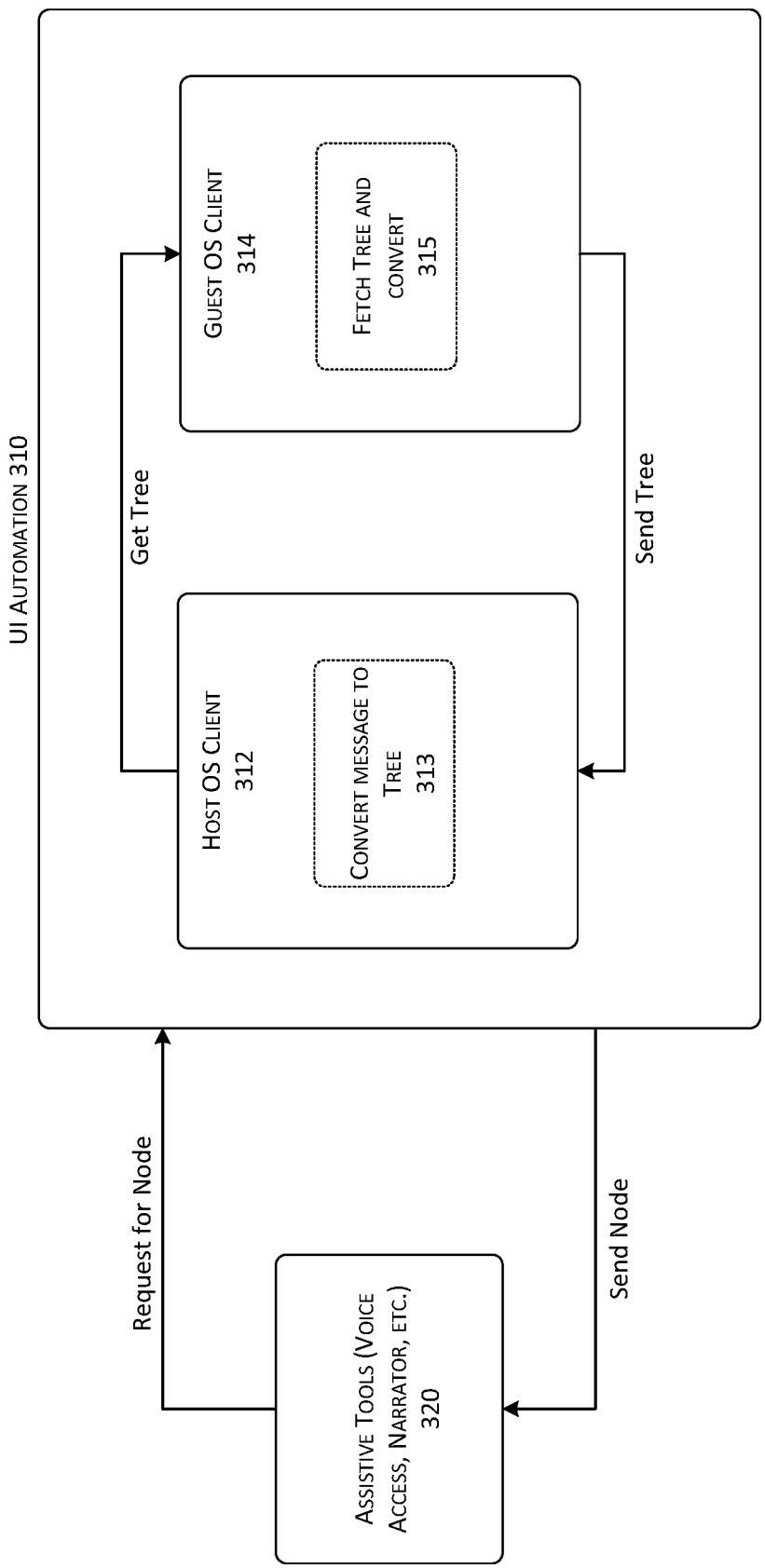
FIG. 3 is an example functional diagram illustrating the disclosed embodiments.

FIG. 3 illustrates an example data flow for accessing an assistive tree. In an example, an assistive tool 320 makes a synchronous call to a component in UI automation 310. The host OS client 312 queries the data from the guest OS client 314. In an embodiment, the query can be a synchronous call to load the tree in a viewport. A process 313 is run to convert received messages to a tree. When the UI is updated, the host OS client 312 sends an event to the guest OS client 314, a function 315 is run to fetch the corresponding tree and convert the tree, and the assistive tree information is sent to the host OS client 312. The host OS client 312

Figure 4:
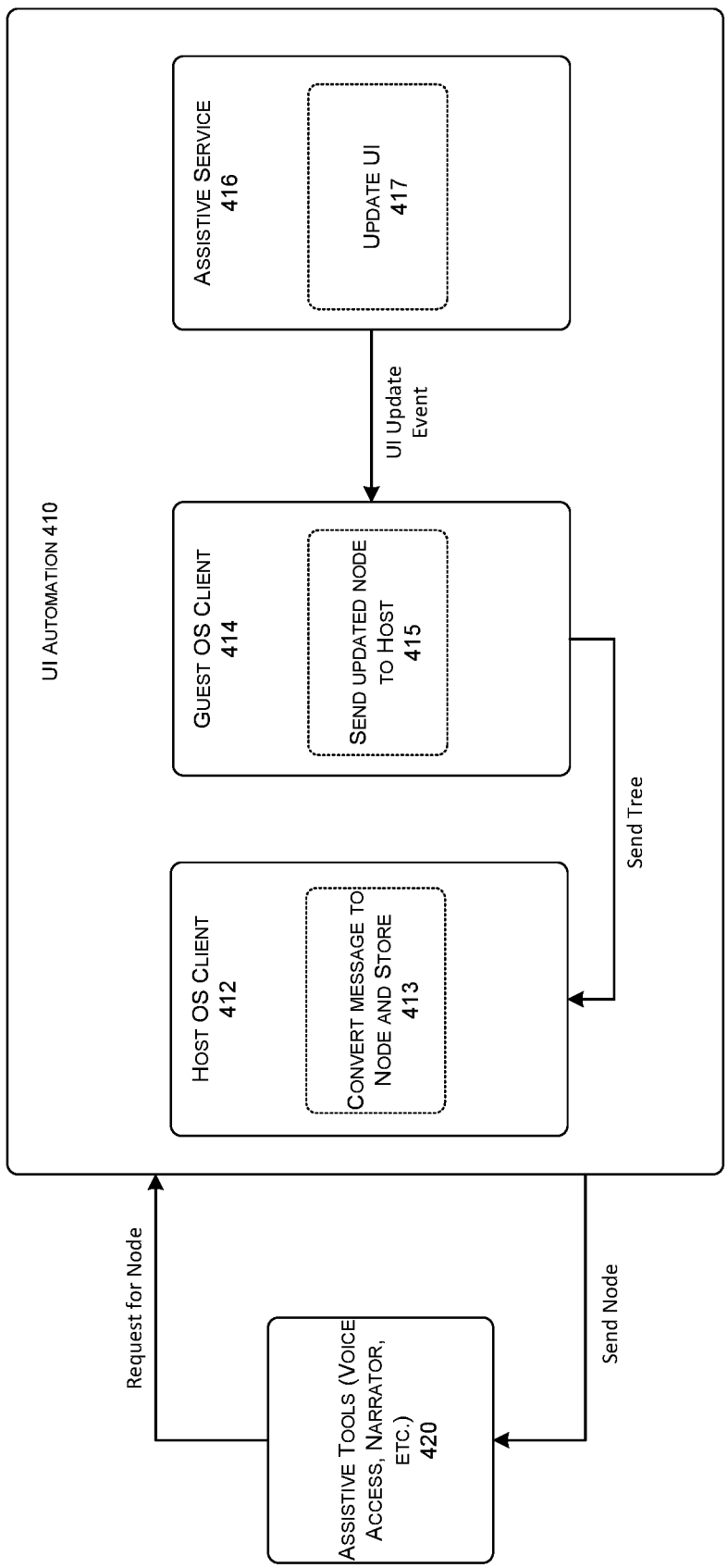
FIG. 4 is an example functional diagram illustrating the disclosed embodiments.

FIG. 4 illustrates an example of processing assistive events including, for example, content change, button clicks, and content changes. Assistive tools 420 perform a callback to the host OS client 412 in response to a UI event. Host OS client 412 runs a process to convert messages to a node 413 and store the node. In an example, an event TYPE_WINDOW_CONTENT_CHANGED can be generated by assistive service 416 in UI automation function 410. Assistive service 416 runs a process 417 to update a UI, and a UI update event is sent to guest OS client 414. Guest OS client 414 sends an updated node 415 to host OS client 412.

The following is an example of UI automation to control mapping in an embodiment implemented between ANDROID OS and WINDOWS OS. The table illustrates an example mapping that allows for bridging between ANDROID OS and WINDOWS OS that illustrates the techniques disclosed herein, including control types and control type identifiers.

| WINDOWS Control Type | ANDROID Control Type | Control Type Identifier |
|---|---|---|
| AppBar | | UIA_AppBarControlTypeId |
| Button | android.widget.Button | UIA_ButtonControlTypeId |
| Calendar | android.widget.DatePicker | UIA_CalendarControlTypeId |
| CheckBox | android.widget.CheckBox | UIA_CheckBoxControlTypeId |
| ComboBox | android.widget.Spinner | UIA_ComboBoxControlTypeId |
| DataGrid | | UIA_DataGridControlTypeId |
| DataItem | | UIA_DataItemControlTypeId |
| Document | | UIA_DocumentControlTypeId |
| Edit | android.widget.EditText | UIA_EditControlTypeId |
| Group | | UIA_GroupControlTypeId |
| Header | | UIA_HeaderControlTypeId |
| HeaderItem | | UIA_HeaderItemControlTypeId |
| Hyperlink | | UIA_HyperlinkControlTypeId |
| Image | android.widget.ImageView | UIA_ImageControlTypeId |
| List | | UIA_ListControlTypeId |
| ListItem | | UIA_ListItemControlTypeId |
| Menu | | UIA_MenuControlTypeId |
| MenuBar | | UIA_MenuBarControlTypeId |
| MenuItem | | UIA_MenuItemControlTypeId |
| Pane | | UIA_PaneControlTypeId |
| ProgressBar | | UIA_ProgressBarControlTypeId |
| RadioButton | android.widget.RadioButton | UIA_RadioButtonControlTypeId |
| ScrollBar | | UIA_ScrollBarControlTypeId |
| SemanticZoom | | UIA_SemanticZoomControlTypeId |
| Separator | | UIA_SeparatorControlTypeId |
| Slider | | UIA_SliderControlTypeId |
| Spinner | | UIA_SpinnerControlTypeId |
| SplitButton | | UIA_SplitButtonControlTypeId |

-continued

| WINDOWS Control Type | ANDROID Control Type | Control Type Identifier |
| --- | --- | --- |
| StatusBar | | UIA_StatusBarControlTypeId |
| Tab | | UIA_TabItemControlTypeId |
| TabItem | | UIA_TabItemControlTypeId |
| Table | | UIA_TableControlTypeId |
| Text | android.widget.TextView | UIA_TextControlTypeId |
| Thumb | | UIA_ThumbControlTypeId |
| TitleBar | | UIA_TitleBarControlTypeId |
| ToolBar | | UIA_ToolBarControlTypeId |
| ToolTip | | UIA_ToolTipControlTypeId |
| Tree | | UIA_TreeControlTypeId |
| TreeItem | | UIA_TreeItemControlTypeId |
| Window | | UIA_WindowControlTypeId |

While the illustrated examples make use of bridging between ANDROID and WINDOWS, the disclosed techniques may be used to bridge UI elements between any two or a plurality of operating systems. Each UI element for a first operating system may be mapped to a corresponding UI element in a second operating system. The mapping may be performed statically or dynamically. The mapping may be updated manually or updated automatically using various techniques such as machine learning.

Figure 5:
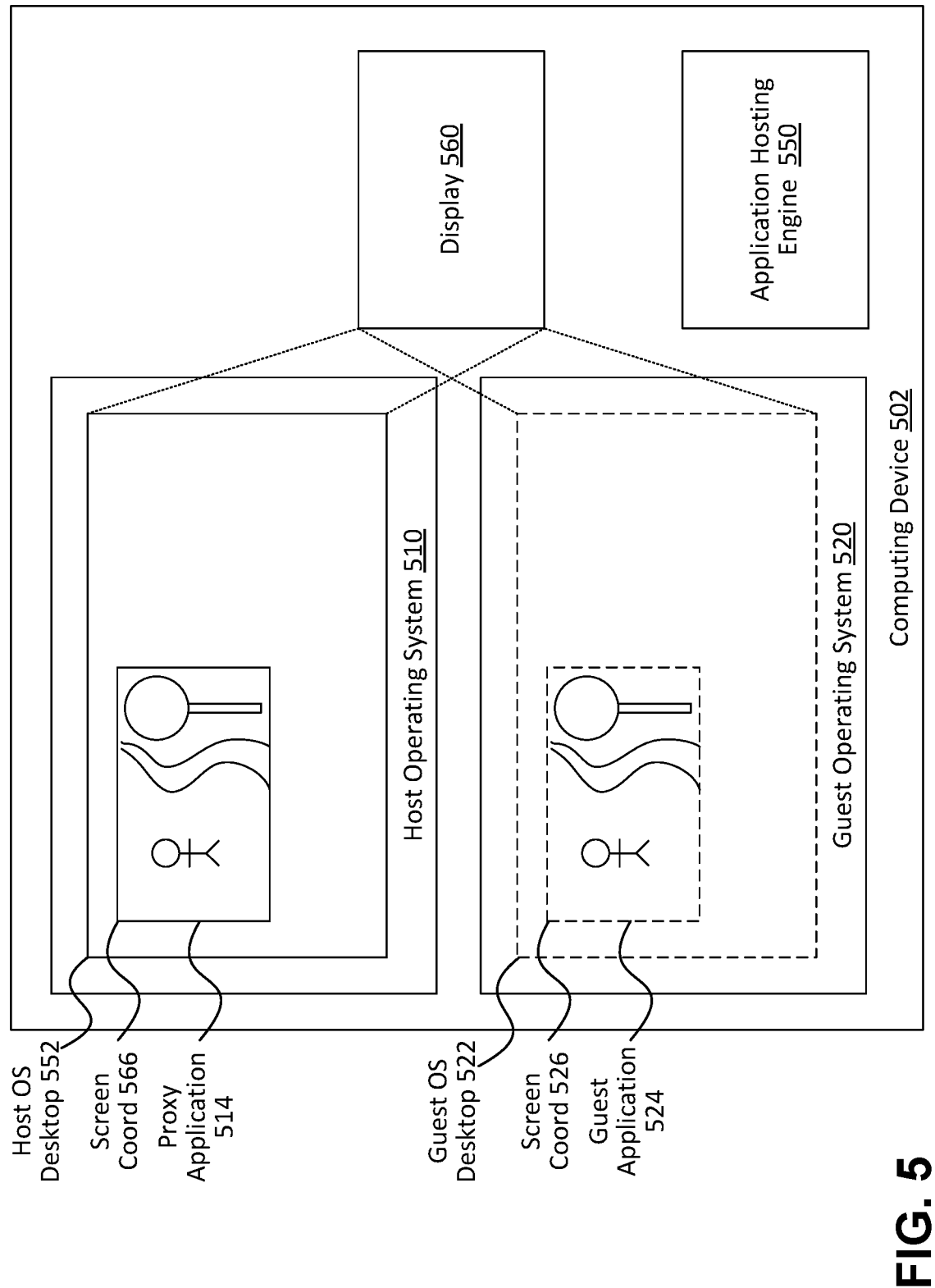
FIG. 5 is an example computing environment according to an embodiment.

FIG. 5 illustrates an application hosting engine 550 rendering a proxy application 514 that contains content generated by a guest application 524. Computing device 502 executes host OS 510, which displays host operating desktop 552 on a display 560. Guest operating system 520 is concurrently executing on computing device 502. Guest OS 520 may be running within a hypervisor, virtual machine, emulator, or the like.

Guest OS 520 renders content to guest OS desktop 522, which is also configured to render content to display 560. As such, guest OS desktop 522 and host OS desktop 552 often have the same dimensions, resolution, and other properties. Guest application 524 is running on guest OS 520. Guest application 524 renders content that would ordinarily be displayed by guest OS 520 on guest OS desktop 522. However, in order to create the impression that guest application 524 is a native application running on host OS 510 and allow increased functionality between guest application 524 and native applications running on host OS 510, application hosting engine 550 renders the content generated by guest application 524 in proxy application 514. Proxy application 514 appears on host OS desktop 552 and operates and appears as a native application of host OS 510. In some configurations, application hosting engine 550 only renders content generated by guest OS 520 that is associated with a guest application that is proxied in host OS 510. That guest OS 520 and guest application 524 do not actually render to display 560 is indicated by dashed lines of guest OS desktop 522 and guest application 524. In some configurations, guest OS 520 renders content to a pseudo display device that does not actually render content to a screen. Specifically, application hosting engine 550 provides guest application 524 with a graphics buffer into which content from guest application 524 is rendered. Proxy application 514 may then use this buffer when rendering content to host OS desktop 552.

Since, as illustrated, guest OS 520 and host OS 510 are configured to use the same display 560, screen coordinates 526 and 566 are the same. As proxy application 514 is moved around host OS desktop 552, application hosting engine 550 will move guest application 524 to the corresponding location within guest OS desktop 522. Similarly, in some embodiments, as proxy application 514 is resized within host desktop 552, application hosting engine 550 will resize guest application 524 to the same width and height. In other embodiments, application hosting engine 550 may keep guest application 524 a constant size while allowing proxy application 514 to be resized. Updating the size and location of guest application 524 in this way is referred to herein as synchronizing size and location of proxy application 514 and guest application 524.

In some configurations, application hosting engine 550 synchronizes the size and location of proxy application 514 and guest application 524 by forwarding UI commands received by proxy application 514, such as mouse click and mouse move events, to guest application 524. In other configurations, application hosting engine 550 maintains focus synchronicity by invoking an API to directly set the size and/or location of guest application 524.

Figure 6:
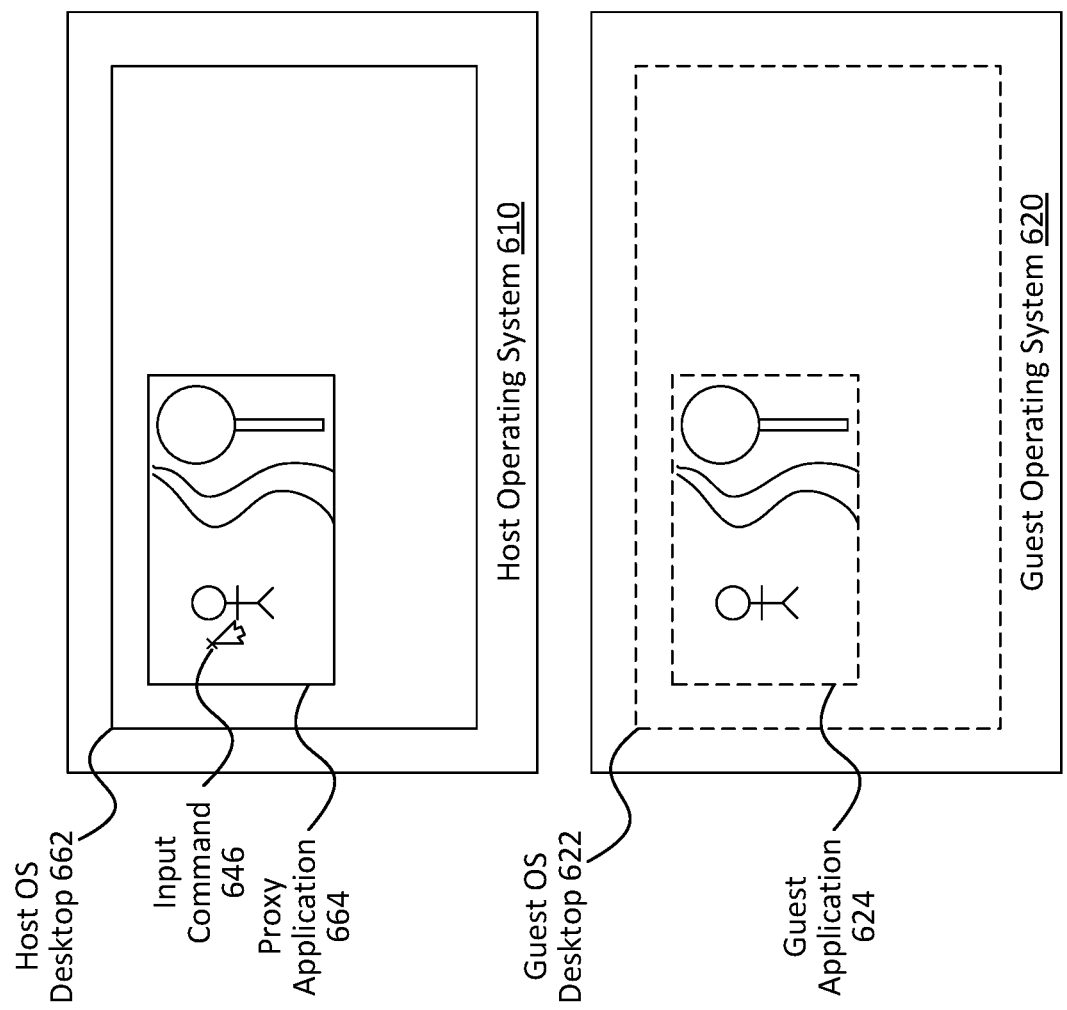
FIG. 6 is an example computing environment according to an embodiment.

FIG. 6 illustrates an input command 646 received by the proxy application 664 rendered on host OS desktop 662 running in host operating system 610. Input command 646 may be a mouse click, keyboard input, touch input, voice command, automation command, the invocation of an operating system user interface API, or any other technique for controlling the proxy application 664. Input command 646 may be the beginning of a sequence of input commands, such as a double click, drag and drop, hover, or other user interface idiom. Guest OS 620 renders content to guest OS desktop 622. Guest application 624 is running on guest OS 620. Guest application 624 renders content on guest OS desktop 622 that would ordinarily be displayed by guest OS 620 on guest OS desktop 622.

Figure 7:
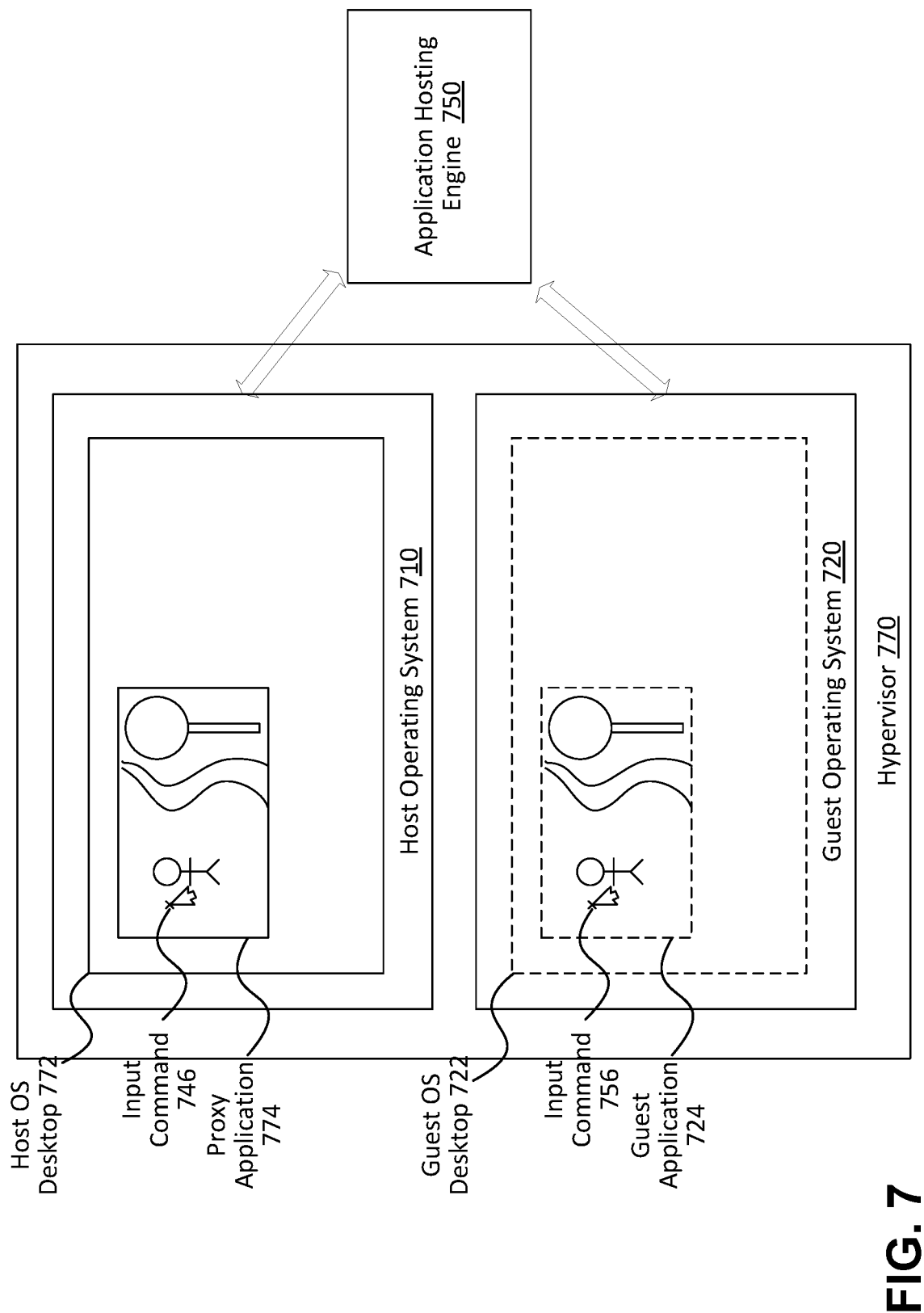
FIG. 7 is an example computing environment according to an embodiment.

FIG. 7 illustrates the input command 746 as provided to the guest application 724 rendered on guest OS desktop 722 by the application hosting engine 750. Application hosting engine 750 provides UI command 746 to guest application 724 as input command 756. Input command 756 may be a direct copy of input command 746 or a translation to one or more corresponding UI commands recognized by applications running on guest OS 720.

For example, if proxy application 774 rendered on host OS desktop 772 receives a mouse click event at a coordinate, application hosting engine 750 may create a mouse click event with the coordinate but that is formatted for applications running on guest OS 720. In some configurations, application hosting engine 750 may then forward the newly created event to guest application 724. In other configurations, application hosting engine 750 forwards the newly created event to guest OS 720, which forwards it to guest application 724. Guest OS 720 may forward the newly created event to guest application 724 because guest application 724 is the focus of guest OS 720, or because the newly created event specifically targets guest application 724. Instead of forwarding the mouse click event, application hosting engine 750 may invoke an automation API, OS API, or an application-specific API to cause guest application 724 to perform a function equivalent to the function that mouse click was expected to perform.

In one example, a first or primary OS is the host OS 710 of a hypervisor 770 and a secondary OS is the guest OS 720 running on the hypervisor 770. The hypervisor 770 is typically a software-based manager for creating and running virtual machines. Instead of displaying the entire desktop of the guest OS 720, an individual application running on the guest OS 720 may be virtualized, appearing on the desktop of the primary OS. Specifically, a proxy application 774 running on the primary OS renders the user interface of a guest application 724 running on the secondary OS. User interface events received by the proxy application 774 are forwarded to the guest application 724. In this way, the guest application 724 appears and operates as a native application within the desktop of the primary OS. While the example of a hypervisor concurrently running two operating systems on the same device is used throughout this disclosure, any other configurations in which UI elements are bridged between operating systems are also contemplated.

In some configurations, an application hosting engine 750 instantiates the proxy application 774, configures the proxy application 774 to render the UI content of the guest application 724, and provides UI commands received by the proxy application 774 to the guest application 724. The application hosting engine 750 may translate or reformat UI commands received by the proxy application 774 to the equivalent UI commands of the secondary OS. For example, when the proxy application 774 receives a primary OS mouse click event, the application hosting engine 750 will translate or reformat the primary OS mouse click event as necessary to create a secondary OS mouse click event. The application hosting engine then forwards the secondary OS mouse click event to the secondary OS. The secondary OS forwards the secondary OS mouse click event to the application with the focus of the secondary OS.

Generally, an operating system provides focus to one application at a time, referring to the operating system only supporting direct user interaction with one application at a time. Specifically, user input from a keyboard, mouse, finger, voice or other input mechanism is sent to a focused application, which can also be referred to as a foreground application or an active application. The focused application is typically distinguished visually from background applications that do not receive user input. Setting the focus of an operating system refers to selecting which application receives user input. As used herein, references to a focused application also refer to a focused window, or an aspect of a GUI the operating system directs user input to.

Figure 8:
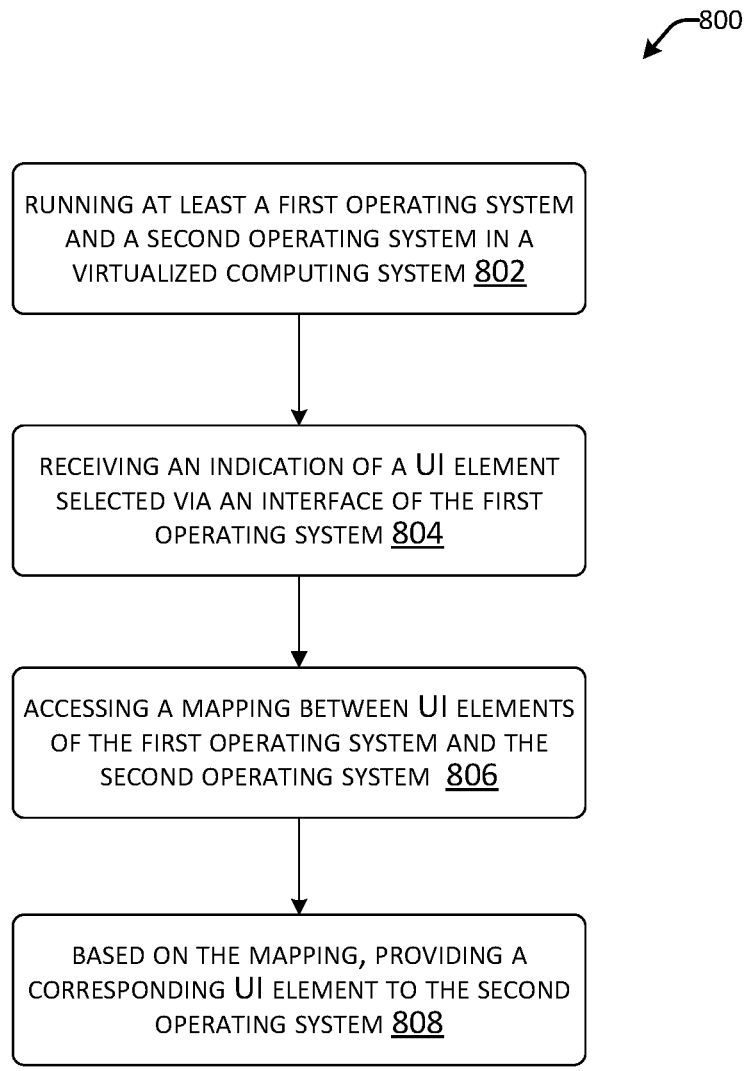
FIG. 8 is an example operational procedure according to an embodiment.

Turning now to FIG. 8, illustrated are aspects of a routine for enabling use of user UI elements across multiple operating systems. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 8, routine 800 begins at operation 802, which illustrates running at least a first operating system and a second operating system in a virtualized computing system.

Operation 804 illustrates receiving an indication of a UI element selected via an interface at the first operating system.

Operation 806 illustrates accessing a mapping between UI elements of the first operating system and the second operating system.

Operation 808 illustrates based on the mapping, providing a corresponding UI element to the second operating system. The corresponding UI element provides an equivalent UI element in the second operating system that corresponds to the UI element entered via the interface at the first operating system.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 9:
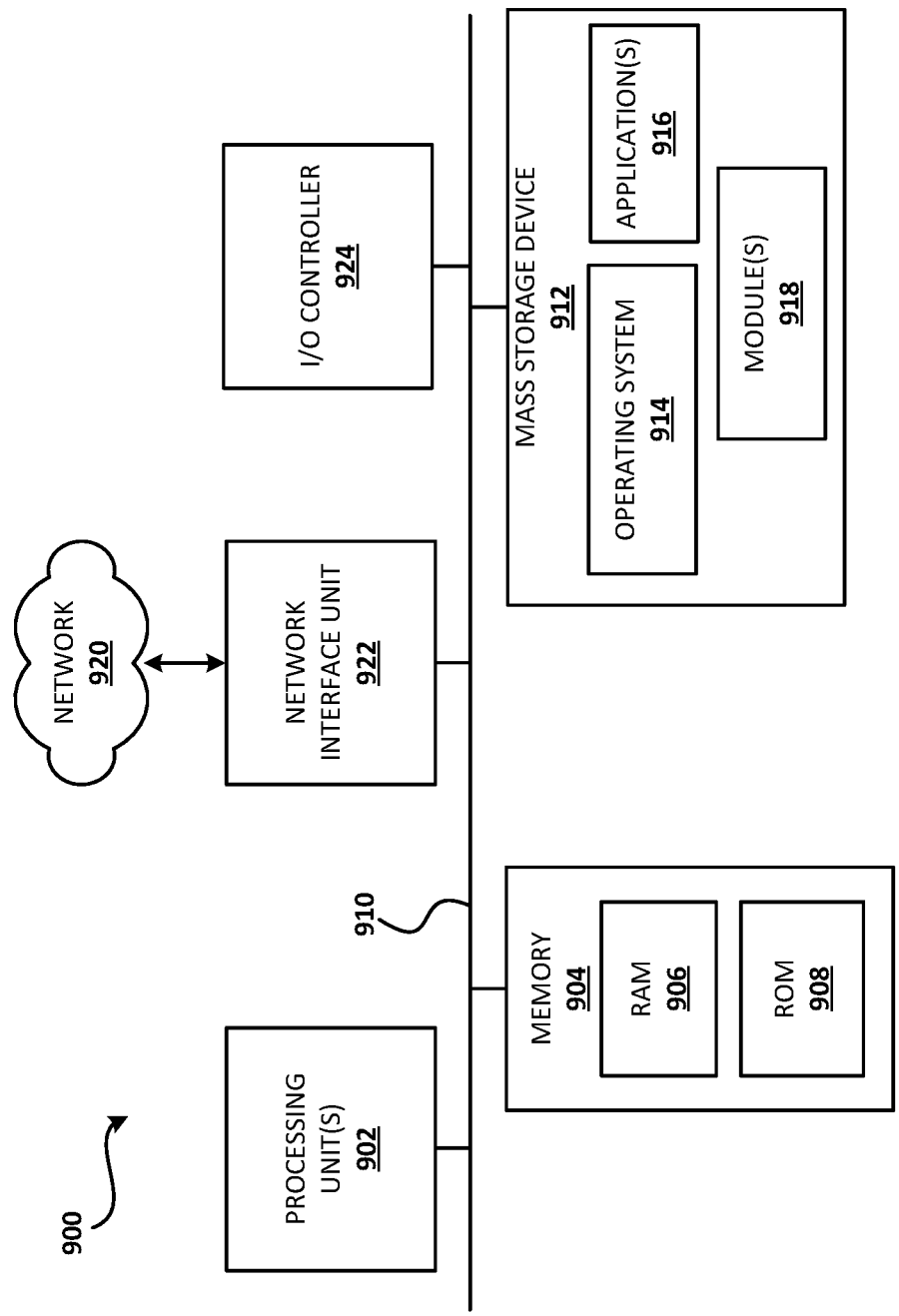
FIG. 9 is a computer architecture diagram illustrating an illustrative computer hardware and software architecture for a computing system capable of implementing aspects of the techniques and technologies presented herein.

FIG. 9 shows additional details of an example computer architecture 900 for a device, such as a computer or a server configured as part of the systems described herein, capable of executing computer instructions (e.g., a module or a program component described herein). The computer architecture 900 illustrated in FIG. 9 includes processing unit(s) 902, a system memory 904, including a random-access memory 906 ("RAM") and a read-only memory ("ROM") 908, and a system bus 910 that couples the memory 904 to the processing unit(s) 902.

Processing unit(s), such as processing unit(s) 902, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 900, such as during startup, is stored in the ROM 908. The computer architecture 900 further includes a mass storage device 912 for storing an operating system 914, application(s) 916, modules 918, and other data described herein.

The mass storage device 912 is connected to processing unit(s) 902 through a mass storage controller connected to the bus 910. The mass storage device 912 and its associated computer-readable media provide non-volatile storage for the computer architecture 900. Although the description of computer-readable media contained herein refers to a mass storage device, it should be appreciated by those skilled in the art that computer-readable media can be any available computer-readable storage media or communication media that can be accessed by the computer architecture 900.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 900 may operate in a networked environment using logical connections to remote computers through the network 920. The computer architecture 900 may connect to the network 920 through a network interface unit 922 connected to the bus 910. The computer architecture 900 also may include an input/output controller 924 for receiving and processing input from a number of other devices, including a keyboard, mouse, touch, or electronic stylus or pen. Similarly, the input/output controller 924 may provide output to a display screen, a printer, or other type of output device.

It should be appreciated that the software components described herein may, when loaded into the processing unit(s) 902 and executed, transform the processing unit(s) 902 and the overall computer architecture 900 from a general-purpose computing system into a special-purpose computing system customized to facilitate the functionality presented herein. The processing unit(s) 902 may be constructed from any number of transistors or other discrete circuit elements, which may individually or collectively assume any number of states. More specifically, the processing unit(s) 902 may operate as a finite-state machine, in response to executable instructions contained within the software modules disclosed herein. These computer-executable instructions may transform the processing unit(s) 902 by specifying how the processing unit(s) 902 transition between states, thereby transforming the transistors or other discrete hardware elements constituting the processing unit(s) 902.

Figure 10:
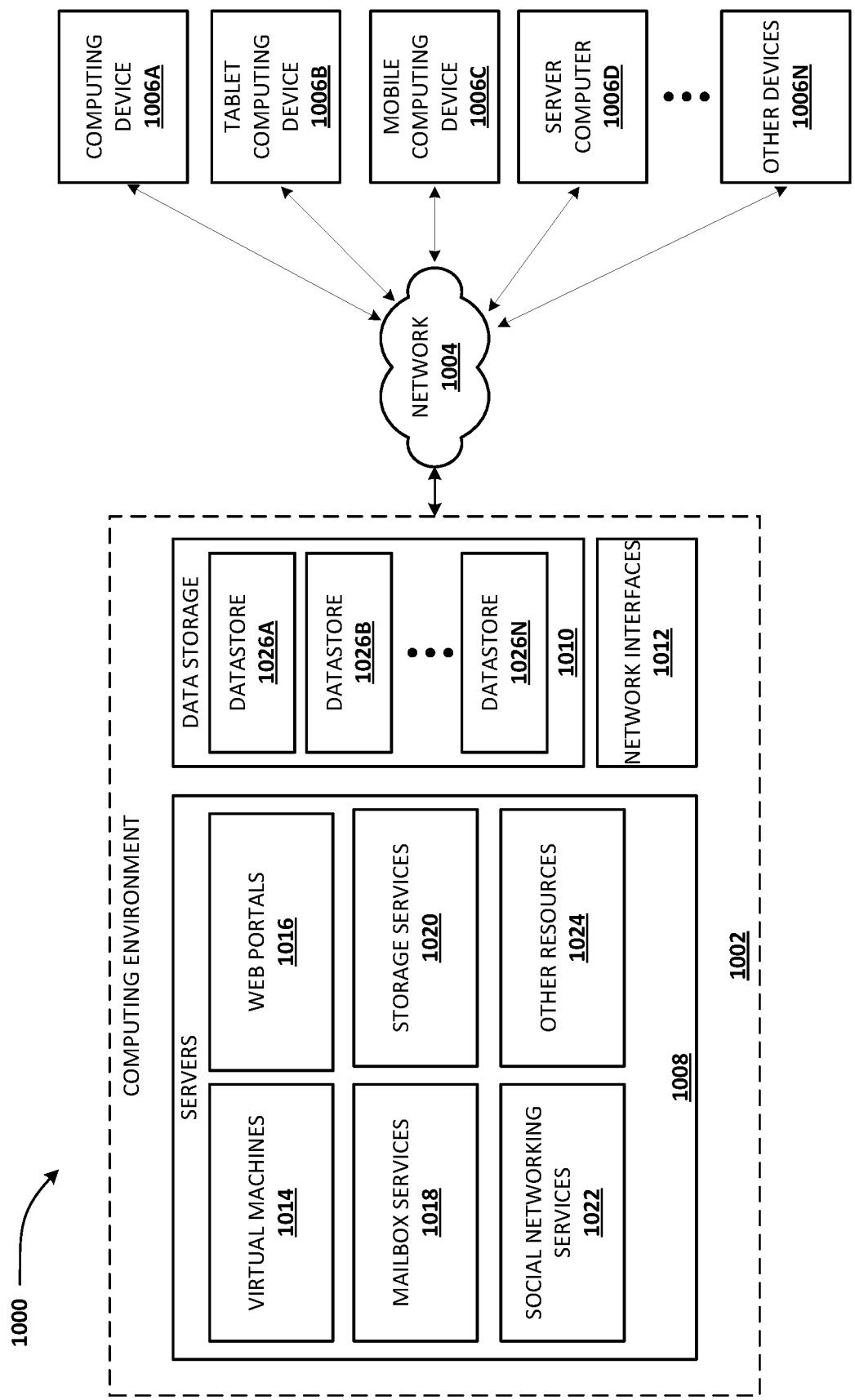
FIG. 10 is a diagram illustrating a distributed computing environment capable of implementing aspects of the techniques and technologies presented herein.

FIG. 10 depicts an illustrative distributed computing environment 1000 capable of executing the software components described herein. Thus, the distributed computing environment 1000 illustrated in FIG. 10 can be utilized to execute any aspects of the software components presented herein. For example, the distributed computing environment 1000 can be utilized to execute aspects of the software components described herein.

Accordingly, the distributed computing environment 1000 can include a computing environment 1002 operating on, in communication with, or as part of the network 1004. The network 1004 can include various access networks. One or more client devices 1006A-1006N (hereinafter referred to collectively and/or generically as "clients 1006" and also referred to herein as computing devices 1006) can communicate with the computing environment 1002 via the network 1004. In one illustrated configuration, the clients 1006 include a computing device 1006A such as a laptop computer, a desktop computer, or other computing device; a slate or tablet computing device ("tablet computing device") 1006B; a mobile computing device 1006C such as a mobile telephone, a smart phone, or other mobile computing device; a server computer 1006D; and/or other devices 1006N. It should be understood that any number of clients 1006 can communicate with the computing environment 1002.

In various examples, the computing environment 1002 includes servers 1008, data storage 1010, and one or more network interfaces 1012. The servers 1008 can host various services, virtual machines, portals, and/or other resources. In the illustrated configuration, the servers 1008 host virtual machines 1014, Web portals 1016, mailbox services 1018, storage services 1020, and/or, social networking services 1022. As shown in FIG. 6 the servers 1008 also can host other services, applications, portals, and/or other resources ("other resources") 1024.

As mentioned above, the computing environment 1002 can include the data storage 1010. According to various implementations, the functionality of the data storage 1010 is provided by one or more databases operating on, or in communication with, the network 1004. The functionality of the data storage 1010 also can be provided by one or more servers configured to host data for the computing environment 1002. The data storage 1010 can include, host, or provide one or more real or virtual datastores 1026A-1026N (hereinafter referred to collectively and/or generically as "datastores 1026"). The datastores 1026 are configured to host data used or created by the servers 1008 and/or other data. That is, the datastores 1026 also can host or store web page documents, word documents, presentation documents, data structures, algorithms for execution by a recommendation engine, and/or other data utilized by any application program. Aspects of the datastores 1026 may be associated with a service for storing files.

The computing environment 1002 can communicate with, or be accessed by, the network interfaces 1012. The network interfaces 1012 can include various types of network hardware and software for supporting communications between two or more computing devices including, but not limited to, the computing devices and the servers. It should be appreciated that the network interfaces 1012 also may be utilized to connect to other types of networks and/or computer systems.

It should be understood that the distributed computing environment 1000 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 1000 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 1000 to utilize the functionality described herein for providing the techniques disclosed herein, among other aspects.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method for enabling use of user interface (UI) elements across multiple operating systems, the method comprising:
running at least a first operating system and a second operating system in a virtualized computing system;
receiving an indication of a UI element selected via an interface of the first operating system;
accessing a mapping between UI elements of the first operating system and the second operating system; and
based on the mapping, providing a corresponding UI element to the second operating system.

Clause 2: The method of clause 1, wherein receiving the indication of the UI element comprises receiving the indication of the UI element via a user interface generated by a guest application and rendered in a desktop of the first operating system.

Clause 3: The method of any of clauses 1-2, wherein receiving the indication of the UI element comprises receiving a control type and a control pattern associated with the UI element.

Clause 4: The method of any of clauses 1-3, wherein receiving the control type and the control pattern associated with the UI element comprises receiving a set of properties that are specific to a particular control type.

Clause 5: The method of any of clauses 1-4, wherein receiving the indication of the UI element comprises receiving a tree structure that includes the indication of the UI element.

Clause 6: The method of any of clauses 1-5, wherein the UI element is for an assistive feature.

Clause 7: The method of clauses 1-6, wherein running the first operating system comprises running the first operating system on an emulator operating in the virtualized computing system.

Clause 8: The method of any of clauses 1-7, further comprising instantiating an application programming interface (API) configured to expose custom controls to applications and receive requests for information about the applications.

Clause 9: The method of any of clauses 1-8, further comprising instantiating a UI bridge configured to communicate with the first operating system via an assistive service of the first operating system that communicates with applications running on the first operating system.

Clause 10: A system, comprising:
one or more processors; and
a computer-readable storage medium having encoded thereon computer-executable instructions to cause the one or more processors to perform operations comprising:
receiving an indication of a UI element selected via an interface of a first operating system, the UI element comprising a control type and control pattern;
accessing a mapping between UI elements of the first operating system and a second operating system, the UI elements of the mapping comprising a control type and control pattern; and
based on the mapping, providing a corresponding UI element to the second operating system.

Clause 11: The system of clause 10, wherein the UI element is contained in a tree structure.

Clause 12: The system of any of clauses 10 and 11, wherein the UI element is for an assistive feature.

Clause 13: The system of any of clauses 10-12, wherein the first operating system is configured to run in an emulator operating in the system.

Clause 14: The system of any of clauses 10-13, further comprising computer-executable instructions that, when executed by the one or more processors, cause the system to perform operations comprising instantiating an application programming interface (API) configured to expose custom controls to applications and receive requests for information about the applications.

Clause 15: The system of any of clauses 10-14, further comprising computer-executable instructions that, when executed by the one or more processors, cause the system to perform operations comprising instantiating a UI bridge configured to communicate with the first operating system via an assistive service of the first operating system that communicates with applications running on the first operating syst.

Clause 16: A computer-readable storage medium having computer-executable instructions stored thereupon which, when executed by one or more processors of a computing device, cause the computing device to perform operations comprising:
receiving a UI element selected via an interface of a first operating system, the UI element comprising a control type and control pattern;
accessing a mapping between UI elements of the first operating system and a second operating system, the UI elements of the mapping comprising a control type and control pattern; and
based on the mapping, providing a corresponding UI element to the second operating system.

Clause 17: The computer-readable storage medium of clause 16, further comprising computer-executable instructions that, when executed by the one or more processors, cause the computing device to perform operations comprising instantiating an application programming interface (API) configured to expose custom controls to applications and receive requests for information about the applications.

Clause 18: The computer-readable storage medium of any of clauses 16 and 17, wherein the UI element comprises a control type and control pattern.

Clause 19: The computer-readable storage medium of any of clauses 16-18, wherein the UI element is contained in a tree structure.

Clause 20: The computer-readable storage medium of any of clauses 16-19, further comprising computer-executable instructions that, when executed by the one or more processors, cause the computing device to perform operations comprising instantiating a user interface (UI) bridge configured to communicate with the first operating system via an assistive service of the first operating system that communicates with applications running on the first operating system.

What is claimed is:

1. A method for enabling use of user interface (UI) elements across multiple operating systems, the method comprising:
running at least a first operating system and a second operating system in a virtualized computing system;
receiving an indication of a UI element selected via an interface of the first operating system;
accessing a mapping between UI elements of the first operating system and the second operating system; wherein:
custom UI features of the UI elements of the first operating system are mapped to control types defining input controls that a given UI feature supports, the control types indicative of appearance and functionality of the UI elements as a single entity;
wherein the mapping includes:
control patterns where the control patterns define functional behavior of a UI element and where the control types are indicative of:
control patterns that a given UI control supports,
control patterns that are optional, or
control patterns that are not supported;
property values for the control types, the property values indicative of UI properties that the given UI control supports; and
UI events indicative of operating system-generated responses to user inputs, wherein each control type comprises a set of UI events that the control type supports; and
based on the mapping, providing a corresponding UI element to the second operating system.

2. The method of claim 1, wherein receiving the indication of the UI element comprises receiving the indication of the UI element via a user interface generated by a guest application and rendered in a desktop of the first operating system.

3. The method of claim 1, wherein receiving the indication of the UI element comprises receiving a tree structure that includes the indication of the UI element.

4. The method of claim 1, wherein the UI element is for an assistive feature.

5. The method of claim 1, wherein running the first operating system comprises running the first operating system on an emulator operating in the virtualized computing system.

6. The method of claim 1, further comprising instantiating an application programming interface (API) configured to expose custom controls to applications and receive requests for information about the applications.

7. The method of claim 1, further comprising instantiating a UI bridge configured to communicate with the first operating system via an assistive service of the first operating system that communicates with applications running on the first operating system.

8. A system, comprising:
one or more processors; and
a computer-readable storage medium having encoded thereon computer-executable instructions to cause the one or more processors to perform operations comprising:
receiving an indication of a UI element selected via an interface of a first operating system;
accessing a mapping between UI elements of the first operating system and a second operating system; wherein:
custom UI features of the UI elements of the first operating system are mapped to control types defining input controls that a given UI feature supports, the control types indicative of appearance and functionality of the UI elements as a single entity;
wherein the mapping includes:
control patterns where the control patterns define functional behavior of a UI element and where the control types are indicative of:
control patterns that a given UI control supports,
control patterns that are optional, or
control patterns that are not supported;
property values for the control types, the property values indicative of UI properties that the given UI control supports; and
UI events indicative of operating system-generated responses to user inputs, wherein each control type comprises a set of UI events that the control type supports; and
based on the mapping, providing a corresponding UI element to the second operating system.

9. The system of claim 8, wherein the UI element is contained in a tree structure.

10. The system of claim 8, wherein the UI element is for an assistive feature.

11. The system of claim 8, wherein the first operating system is configured to run in an emulator operating in the system.

12. The system of claim 8, further comprising computer-executable instructions that, when executed by the one or more processors, cause the system to perform operations comprising instantiating an application programming interface (API) configured to expose custom controls to applications and receive requests for information about the applications.

13. The system of claim 8, further comprising computer-executable instructions that, when executed by the one or more processors, cause the system to perform operations comprising instantiating a UI bridge configured to communicate with the first operating system via an assistive service of the first operating system that communicates with applications running on the first operating system.

14. A computer-readable storage medium having computer-executable instructions stored thereupon which, when executed by one or more processors of a computing device, cause the computing device to perform operations comprising:
receiving a UI element selected via an interface of a first operating system;
accessing a mapping between UI elements of the first operating system and a second operating system; wherein:
custom UI features of the UI elements of the first operating system are mapped to control types defining input controls that a given UI feature supports, the control types indicative of appearance and functionality of the UI elements as a single entity;
wherein the mapping includes:
control patterns where the control patterns define functional behavior of a UI element and where the control types are indicative of:
control patterns that a given UI control supports,
control patterns that are optional, or
control patterns that are not supported;
property values for the control types, the property values indicative of UI properties that the given UI control supports; and
UI events indicative of operating system-generated responses to user inputs, wherein each control type comprises a set of UI events that the control type supports; and
based on the mapping, providing a corresponding UI element to the second operating system.

15. The computer-readable storage medium of claim 14, further comprising computer-executable instructions that, when executed by the one or more processors, cause the computing device to perform operations comprising instantiating an application programming interface (API) configured to expose custom controls to applications and receive requests for information about the applications.

16. The computer-readable storage medium of claim 14, wherein the UI element is contained in a tree structure.

17. The computer-readable storage medium of claim 16, further comprising computer-executable instructions that, when executed by the one or more processors, cause the computing device to perform operations comprising instantiating a user interface (UI) bridge configured to communicate with the first operating system via an assistive service of the first operating system that communicates with applications running on the first operating system.

* * * * *